United States Patent [19]

Flint

[11] 3,998,680
[45] Dec. 21, 1976

[54] METHOD OF FABRICATING INSULATING GLASS UNITS

[76] Inventor: Theodore R. Flint, Jug Hollow Road, Valley Forge, Pa. 19481

[22] Filed: Oct. 28, 1975

[21] Appl. No.: 626,230

[52] U.S. Cl. .................. 156/109; 52/616; 156/107; 428/34; 428/83
[51] Int. Cl.² ............ C03C 27/00; E06B 3/24
[58] Field of Search ............ 428/34, 440, 441, 83; 156/109, 107; 52/616

[56] References Cited
UNITED STATES PATENTS

| | | | |
|---|---|---|---|
| 2,025,716 | 12/1935 | Black | 428/34 |
| 2,273,733 | 2/1942 | Paddock | 428/34 |
| 2,966,435 | 12/1960 | Kassinger | 428/34 |
| 3,527,663 | 9/1970 | Rose et al. | 428/34 |
| 3,759,771 | 9/1973 | Battersby | 428/34 |
| 3,791,910 | 2/1974 | Bowser | 156/109 |
| 3,852,149 | 12/1974 | Sitter et al. | 156/109 |

*Primary Examiner*—George F. Lesmes
*Assistant Examiner*—Charles E. Lipsey
*Attorney, Agent, or Firm*—Howson and Howson

[57] ABSTRACT

A method of fabricating insulating glass units with a hot-melt butyl rubber sealant composition is disclosed as are insulating glass units produced by the method of this invention.

3 Claims, 6 Drawing Figures

U.S. Patent  Dec. 21, 1976  3,998,680
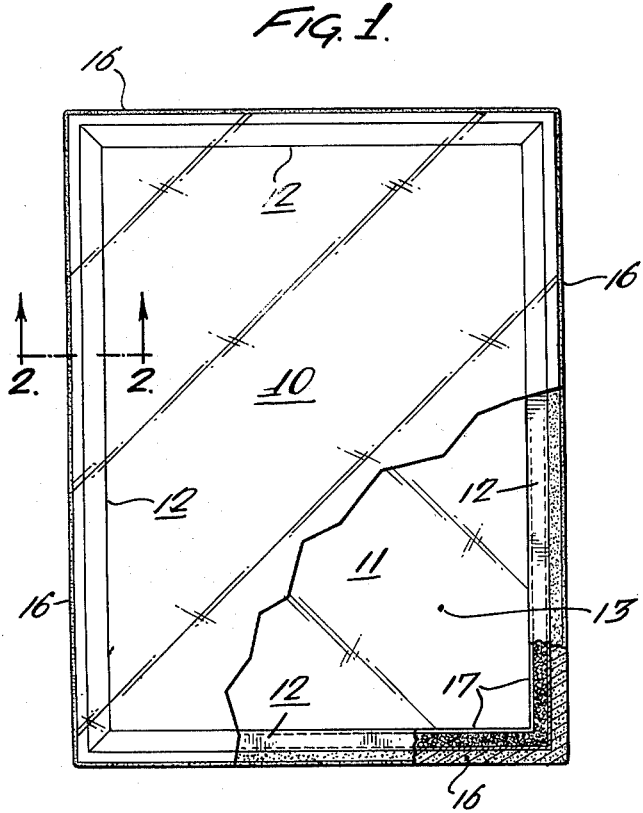
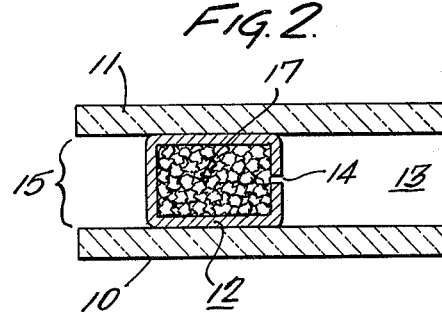
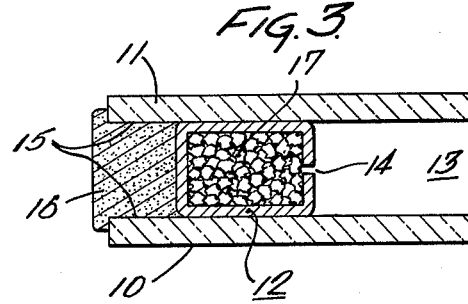
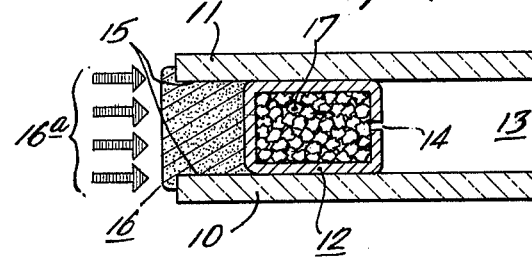
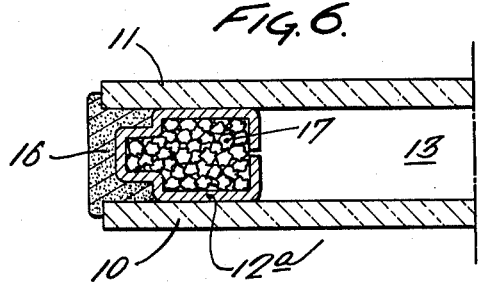
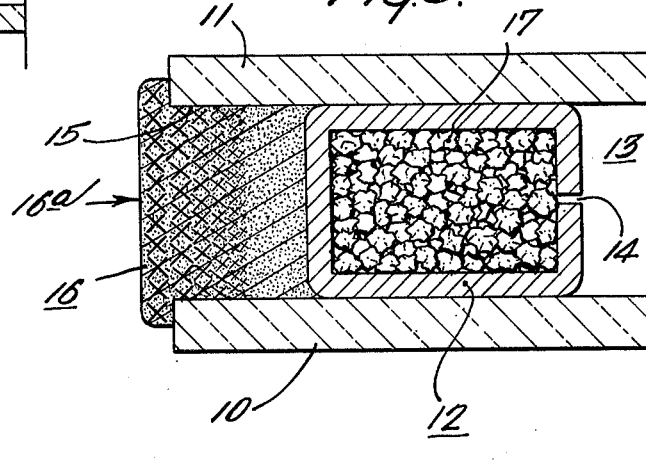

METHOD OF FABRICATING INSULATING GLASS UNITS

BACKGROUND OF THE INVENTION

Insulating glass units are well-known. They generally comprise at least two sheets of glass spaced from one another by a spacer element thereby providing a dead or insulating air space between the panes of glass. Many attempts have been made to hermetically seal insulating glass units so as to provide a barrier against air, dust, and water vapor. Typical methods used to seal insulating glass units are described in U.S. Pat. Nos. 3,759,771 and 3,852,149.

The types of sealants previously used in preparing insulating glass units include sealants made from polysulfide materials which cure or crosslink at room temperature after application to the insulating glass unit. Such sealants provide adhesion of a chemical nature involving a chemical bond between glass, the metal spacing member and the sealant, generally brough about through a chemical intermediate.

Another type of sealant consists of uncrosslinked polymers such as butyl and polyisobutylene applied by hot-melt application. Hot-melt sealants, particularly those made from butyl rubber, plasticizers and fillers are useful insulating glass sealants since they possess inherently low water vapor transmission rates. Since hot melt butyl sealants usually contain no solvents, shrinkage is minimal after these materials have been applied to an insulating glass unit and completely crosslinked or cured. Adhesion in such systems is usually of a physical nature employing the tacky properties of the butyl base polymers and any additives which contribute to tack. It is necessary, however, to apply mechanical banding about the periphery of insulating glass units sealed with this type of hot-melt sealant to prevent movement of the sealant due to creep, cold flow, stress or excessive temperature changes.

Another type of sealant comprises the application of uncrosslinked polymers in tape form or hot-melt form followed by the application of a second crosslinking sealant about the perimeter of the insulating glass unit to add structural strength. This type of sealant is particularly desirable since it provides both chemical and physical adhesion of the glass and spacer element making up the insulating glass unit. Further, in the event either of the sealants shall fail, the remaining sealant may be sufficient to maintain the integrity of the unit.

Regardless of the type of sealant used in forming the insulating glass unit, the function of the sealant is twofold. First, the sealant is to provide and maintain the insulating glass unit in a hermetically sealed state and, second, the sealant should have adhesive properties which function to hold the glass panes and spacer element in a predetermined configuration.

An object of this invention is to provide an insulating glass unit and a method of fabricating insulating glass units with a single application sealant which will serve to hermetically seal the insulating glass unit and provide adhesive properties serving to maintain the insulating glass unit in a desired assembled configuration.

A further object is to provide a method for fabricating insulating glass units with a single application sealant having the advantages of ease of application and low water vapor transmission rates demonstrated by hot-melt sealants as well as the strong chemical adhesion and structural strength exhibited by most room temperature vulcanizing sealants.

DETAILED DESCRIPTION OF THE INVENTION

FIG. 1 is an elevational view illustrating a sealed insulating glass unit of the present invention with portions broken away.

FIG. 2 is an enlarged sectional view along lines 2—2 of FIG. 1 illustrating the disposition of the panes of glass and spacing member and the channel about the periphery of the glass unit.

FIG. 3 is a similar view illustrating the application of a sealant composition into the channel about the periphery of the glass unit.

FIG. 4 is a view similar to FIG. 3 illustrating the application of heat to the sealant composition.

FIG. 5 is a greatly enlarged sectional view along lines 2—2 of FIG. 1 illustrating the curing or crosslinking which occurs in the outer portion of the sealant composition on the application of heat.

FIG. 6 is a view similar to FIG. 3 illustrating a modified form of spacing element which may be used in fabricating the insulating glass unit.

In accordance with the present invention there is provided a method of fabricating an insulating glass unit which comprises disposing a spacing member between panes of glass adjacent the edges thereof to hold said panes in a predetermined spaced relation, the spacing member and glass panes cooperating to provide a channel about the assembly, applying a partially crosslinked hot-melt butyl rubber sealant composition into said channel, said sealant being in continuous contact with said glass panes and spacing member and of a type such that substantially complete crosslinking will occur when the composition is heated to from about 325° to about 425° F. and applying sufficient heat to the exterior face of said sealant composition to raise the temperature of the outermost portion of the sealant composition to from about 325° to about 425° F. while the innermost portion of the sealant composition remains at a temperature substantially below about 325° to about 425° F. forming a high-strength thermoset bond about the outer periphery of the channel while the innermost portion of the sealant composition adjacent the spacing member remains partially crosslinked providing a high tack, adhesive bond about the inner periphery of the channel.

Considering the invention in greater detail in connection with the appended drawings, insulating glass units (the term glass unit in the specification and claims refers to and includes insulating glass windows, doors and other types of glazing units) are fabricated by disposing sheets of glass 10 and 11 in predetermined spaced relation to one another by spacing member 12 so as to provide a dead air space 13 between the sheets of glass.

The glass sheets 10 and 11 may be any conventional, commercially available glass cut to desired size. Spacing member 12 may be of conventional type and cross-section, preferably hollow, and may contain a desiccant material 17 such as silica gel and the like. The spacing member may be formed of aluminum, galvanized steel or other metal and may be fabricated by roll forming into a generally tubular configuration having a slightly open butt joint 14. The open butt joint 14 communicates with dead air space 13 to enable desiccant material 17 to dehydrate the air within the dead space thereby precluding condensation in the interior of the glass unit.

Spacing member 12 is located adjacent the edges of glass sheets 10 and 11 about the periphery thereof positioned inward from the marginal edges of the sheets defining in cooperation with sheets 10 and 11 an outwardly facing channel 15 extending about the entire periphery of the unit. Spacing member 12 may be of a generally rectangular configuration as shown in FIGS. 2–5. Spacing member 12 may also be of a configuration such as shown in FIG. 6, for example, wherein a somewhat larger surface area is presented for contact with bonding or sealant material and means are provided to center spacing member 12a between glass sheets 10 and 11.

Bonding or sealant material 16 is supplied in channel 15 about the periphery of the insulating glazing unit. Sealant material 16 is a partially crosslinked hot-melt butyl rubber composition which is applied by means of any suitable hot-melt applicator capable of reducing the hot-melt sealant from a solid to a more or less viscous but non-sagging or thixotropic liquid state which will completely fill channel 15. Sufficient hot-melt sealant composition 16 is supplied to completely fill channel 15 and overlap the edges of glass sheets 10 and 11 forming a complete seal about channel 15 as illustrated in FIG. 4. The hot-melt butyl rubber sealant composition cools rapidly after application to channel 15 and adheres physically by the tacky nature of the uncrosslinked sealant to panes of glass 10 and 11 and spacing member 12 serving to hold the glass panes and spacing member in registry during further assembly.

The hot-melt butyl rubber sealant is formulated so that substantially complete crosslinking or curing will occur when the composition is heated to from about 325° to about 425° F., preferably about 400° F. After application of the hot-melt butyl rubber sealant, heat is applied to the exterior face 16a of sealant material 16 as is shown in FIG. 4. Heat may be supplied by any conventional high heat flux source such as infra red, super-heated air jets or open flame. The application of heat is carefully controlled to ensure that only the exterior portion of hot-melt butyl rubber sealant 16, that is, that portion of the sealant composition which overlaps the ends of glass panes 10 and 11 and is adjacent to the outermost portions of glass panes 10 and 11, e.g. about 30 to about 50% of the total sealant applied to the periphery of the insulating glazing unit, will be heated to a temperature of from about 325° to about 425° F. The interior portion of sealant 16, i.e., that portion of sealant 16 which is adjacent to spacing member 12 and the interior portion of glass panes 10 and 11 in channel 14, remains at a temperature below about 325° F. during the heating process.

Since the sealant 16 is formulated with agents effective to cause crosslinking of the hot-melt butyl rubber sealant when activated at temperatures of from about 325° to about 425° F., preferably about 400° F., heating in the manner described causes sealant material 16 to crosslink or cure in the area heated to temperatures of from about 325° to about 425° F. while the portion of sealant material 16 not heated to about 325° to about 425° F. remains uncrosslinked. In this manner a dual sealant effect is obtained. The exterior and outer portion of sealant 16 is completely thermoset as the result of crosslinking or curing and exhibits excellent structural strength. It will not melt with subsequent heating, and because of its strength, it is not necessary to provide an outer web, band or other mechanical support about the periphery of the insulating glass unit. At the same time, the interior portion of sealant material 16 adjacent spacing member 12 remains uncrosslinked in the form of a sticky mastic material which provides excellent adhesion to glass panes 10 and 11 and spacing member 12, and provides a barrier impervious to air, water vapor and the like.

The sealant material 16 forms a strong bond with glass panes 10 and 11, however, a coating of primer or a tie coat may be applied to the surface of the glass to be bonded prior to application of the sealant material. Also various silane compounds may be incorporated into the butyl rubber sealant to improve adhesion of the butyl polymer to glass and aluminim. The use of from about 2 to about 10 parts of gamma-methacryl-oxy-propyltrimethoxysilane per 100 parts of butyl rubber, for example, enhances the adhesion of the butyl polymer to glass and aluminum.

A variety of butyl polymers may be used in formulating the hot-melt sealant; for example, a blend of low molecular weight butyl polymers such as Exxon LM-430 butyl polymer and a partially crosslinked butyl polymer such as Cities Service Ex 245 in a ratio of about 2:1 will provide a satisfactory sealant. The blend of butyl polymers is combined with a curing system for butyl rubber comprising an aromatic nitrogen containing compound such as p-quinone dioxime, and an oxidizing agent such as red lead oxide. Butyl rubber curing systems comprising p-quinone dioxime and red lead oxide are well known in the art, and the mechanism through which curing of butyl rubber is accomplished is generally thought to involve oxidation of p-quinone dioxime by red lead oxide, forming in sutu, the active crosslinking agent, p-dinitrosobenzene.

To form the desired sealant, a sufficient amount of each component of the curing system should be combined with the butyl polymer blend to cause complete crosslinking of that portion of the hot-melt sealant heated to a temperature from about 325° to about 425° F., preferably about 400° F. Thus, from about 2 to about 6, preferably about 3 parts of p-quinone dioxime, and from about 4 to about 10, preferably about 8 parts of red lead oxide, per 100 parts of butyl polymer blend are combined to form the hot-melt sealant.

It has been found that the foregoing hot-melt sealant has properties which make it particularly useful in the fabricating of insulating glass units. For example, the hot-melt sealant softens to a viscous, thixotropic state when heated to temperatures of about 250° F. and has a sufficient pot life when heated to this temperature to be easily applied and completely fill channel 15. Also, it can be appreciated that significant flexibility over the amount of sealant 16 which is crosslinked can be achieved through control of the amount of heat applied to sealant 16.

The following example is set forth for purposes of illustration of the invention.

EXAMPLE 1

Glass panes 10 and 11 were assembled with spacing member 12, as shown in FIG. 1 forming a channel 15 about the peripheral edges of the panes. A sealant of the following formulation was applied to channel 15 by a hot-melt application to fill channel 15, overlapping the end of glass panes 10 and 11.

| Butyl polymer | Weight |
| --- | --- |

-continued

| | Weight |
|---|---|
| (Exxon LM-430) | 1000 |
| Butyl polymer | |
| (Cities Service EX 245) | 500 |
| Chlorinated Paraffin | |
| (Pearsall Chemical FLX 0012) | 160 |
| Neodecanoic acid | 20 |
| Silane | |
| (Union Carbide A-174) | 60 |
| Rosin ester | |
| (Arizona Chemical, Zonarex 55) | 150 |
| Diamine antioxidant | |
| (Age Rite White) | 30 |
| Benzothiazyl disulfide | |
| (Altax) | 40 |
| p-quinonedioxime | 25 |
| Red Lead Oxide ($Pb_3O_4$) | 80 |
| Calcium carbonate | 1200 |

On cooling, a partially crosslinked butyl rubber polymer having sufficient adhesion and strength to hold the assembly is formed. Heat was applied to the exterior surface 16a of the butyl polymer causing the temperature in the outer portion of the polymer to reach about 400° F. At this point, exterior portion 16a of the butyl sealant was completely crosslinked providing structural strength and integrity to the glass unit, the inner portion of the butyl polymer remaining uncrosslinked and in a tacky form.

Having thus described the invention,
What is claimed is:

1. A method of fabricating an insulating glass unit which comprises disposing a spacing member between panes of glass adjacent the edges thereof to hold said panes in a predetermined spaced relation, the spacing member and glass panes cooperating to provide a channel about the periphery of the assembly, applying a partially crosslinked hot-melt butyl rubber sealant composition into said channel, said sealant being in continuous contact with said glass panes and spacing member and of a type such that substantially complete crosslinking will occur when the composition is heated to from about 325° to about 425° F., and applying sufficient heat to the exterior face of said sealant composition to raise the temperature of the outermost portion of the sealant composition to from about 325° to about 425° F. while the innermost portion of the sealant composition remains at a temperature substantially below about 325° to about 425° F. thereby causing substantially complete crosslinking of that portion of the sealant composition heated to from about 325° to about 425° F. forming a high-strength thermoset bond about the outer periphery of the channel while the innermost portion of the sealant composition adjacent the spacing member remains partially crosslinked providing a high tack, adhesive bond about the inner periphery of the channel.

2. The method of claim 1 wherein sufficient heat is applied to the exterior face of the sealant composition to raise the temperature of the outermost portion of the sealant composition to about 400° F.

3. The method of claim 1 wherein sufficient heat is applied to the exterior face of said sealant composition to raise the temperature of about 30 to about 50% of the outermost portion of the sealant composition to from about 325° to about 425° F.

* * * * *